United States Patent [19]
Narayanan

[11] 3,835,453
[45] Sept. 10, 1974

[54] CODE GENERATING AND RECEIVING APPARATUS

[76] Inventor: Sarukkai R. Narayanan, 2905 N. Stiles, Apt. D-405, Oklahoma City, Okla. 73105

[22] Filed: June 1, 1972

[21] Appl. No.: 258,791

[52] U.S. Cl. ... 340/146.3 SY, 235/92 R, 235/92 DN
[51] Int. Cl. .............................. G06k 9/16
[58] Field of Search ....... 340/146.3 SY; 178/87, 18; 235/92 DN

[56] References Cited
UNITED STATES PATENTS

| | | | |
|---|---|---|---|
| 3,145,367 | 8/1964 | Crane | 340/146.3 SY |
| 3,342,979 | 9/1967 | Wright | 235/92 DN |
| 3,462,548 | 8/1969 | Rinder | 340/146.3 SY |
| 3,528,295 | 9/1970 | Johnson | 340/146.3 SY |

*Primary Examiner*—Raulfe B. Zache
*Assistant Examiner*—Robert F. Gnuse
*Attorney, Agent, or Firm*—Dunlap, Laney, Hessin, Dougherty & Codding

[57] ABSTRACT

An improved code generating and receiving apparatus having a writing instrument marking indicia on a writing surface in a code generating position and generating indicia indicating signals in response to indicia being marked on the writing surface, the indicia indicating signals being indicative of the marked indicia and a predetermined number of the generated indicia indicating signals comprising the indicia code, and a receiving apparatus receiving, identifying and deciphering the received indicia code, the receiving apparatus generating and transmitting feedback signals to be received by the writing instrument for providing operator-perceivable feedback, in one form. In one aspect, the invention also includes apparatus generating an orientation signal responsive to the orientation of the writing instrument and establishing a movable reference point for identifying the sequence of the indicia indicating signals and generating an indicia code substantially independent of the orientation of the writing instrument.

24 Claims, 10 Drawing Figures

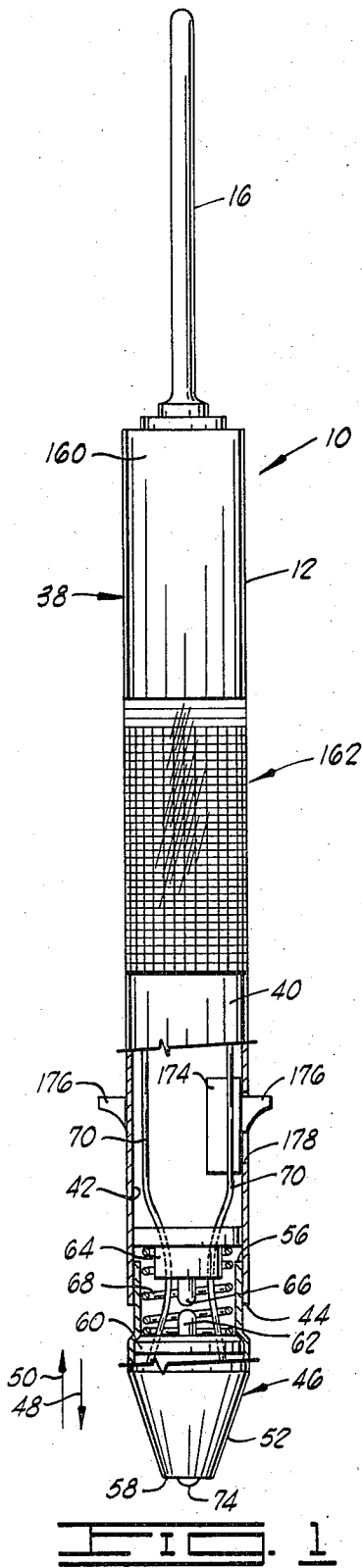
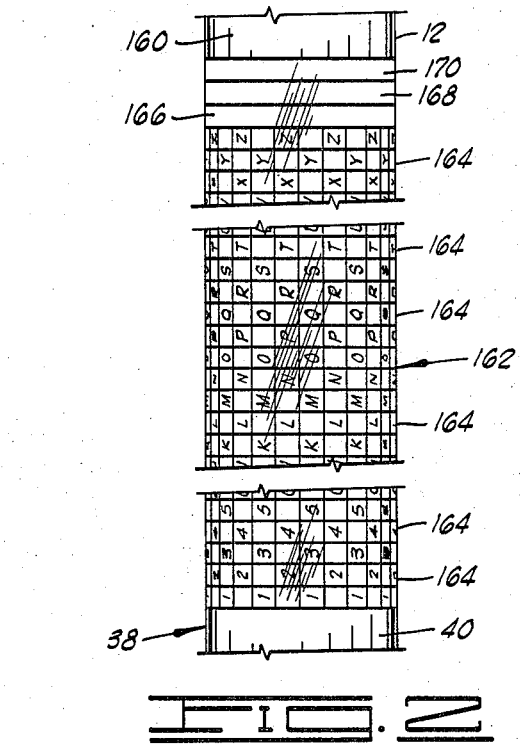
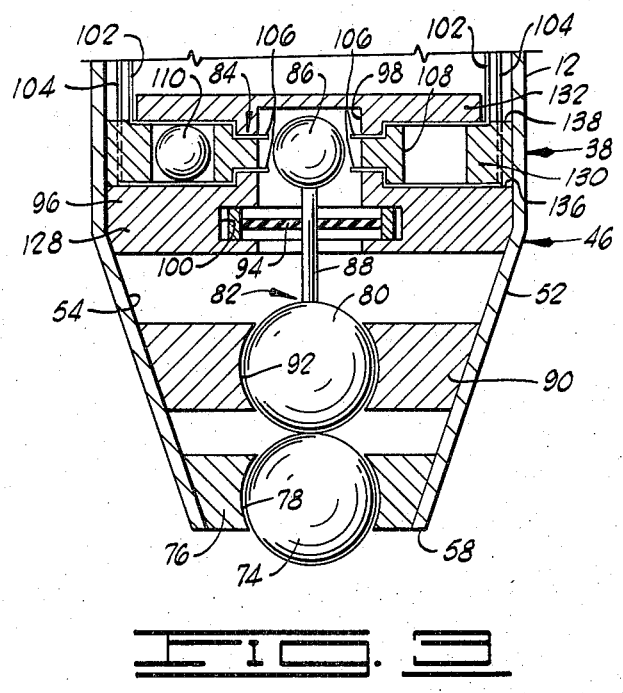

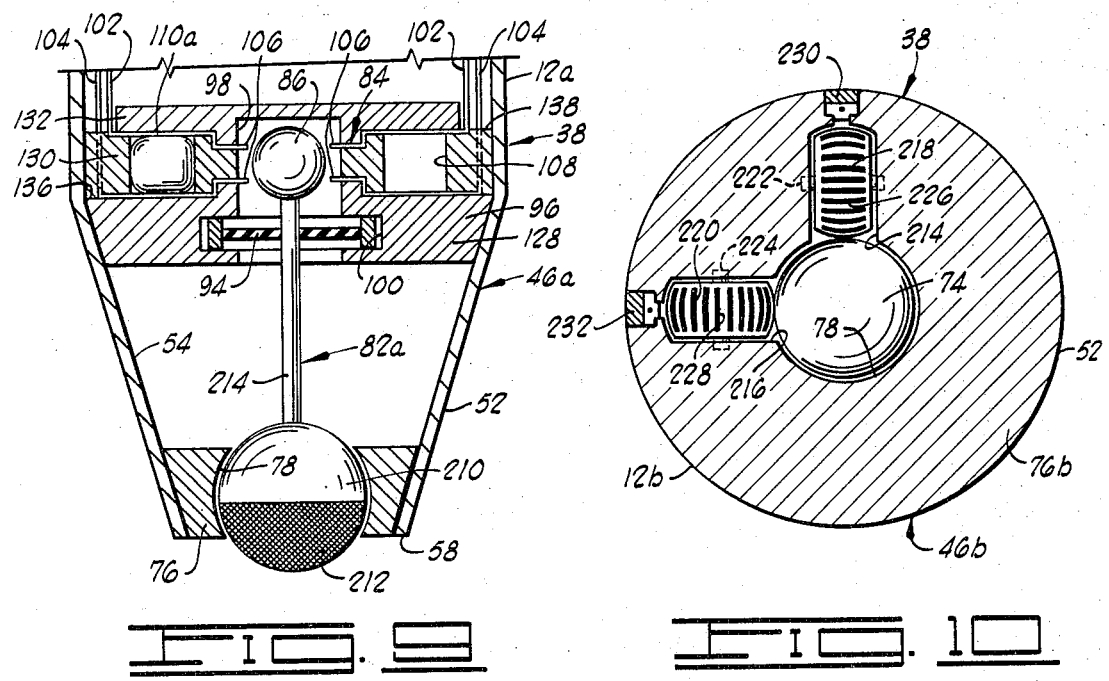

CODE GENERATING AND RECEIVING APPARATUS

BACKGROUND OF THE INVENTION

The present invention relates generally to improvements in code generating apparatus and, more particularly, but not by way of limitation, to a code generating apparatus for marking an indicia on a writing surface and simultaneously generating an indicia code indicative of the marked indicia and receiving apparatus receiving and deciphering the generated indicia code.
Brief Description of the Prior Art Various attempts have been made in the past to construct a writing instrument or the like capable of writing a letter, character, line or the like and simultaneously generating a cognizable, decipherable signal indicative of the particular written indicia. One such writing device was disclosed in the U.S. Pat. No. 3,145,367 issued to Crane, wherein the writing instrument included a plurality of signal generating circuits, each circuit being actuated via a plurality of contacts disposed circumferentially about a shaft connected to the writing tip. The writing tip constituted a common contact and was supported within the writing instrument such that the contacts were contacted in a sequence controlled generally via directional pressure applied to the writing tip to establish and generate a code which was received and identified via a plurality of signal recognition circuits. The holding part of the writing instrument (transducer) was constructed to assure that the writing tip was supported in an upright position during the character generation sequence of operation, the upright orientation of the transducer being a prerequisite to the proper operation of the apparatus. The contacts in the writing instrument were wired to the recognition circuits, the apparatus including a plurality of recognition circuits, each recognition circuit identifying a predetermined character in response to the sequence of contact closures.

A combined writing device and computer input was disclosed in the U.S. Pat. No. 3,462,548 issued to Rinder wherein an analog transducer element was supported within a writing instrument such that the transducer elements were activated via movement of the writing instrument, the activation of the transducer elements generating a character recognition signal. The writing device included a writing head particularly constructed to support the signal generating apparatus in an upright position substantially normal to the writing surface.

The U.S. Pat. No. 3,112,362 issued to Pecker disclosed a character recognition device wherein the writing surface included a plurality of horizontal and vertical zone boundary lines and a character code was generated via the intersection of boundary lines by the writing instrument during the operation thereof. The U.S. Pat. No. 3,108,254 issued to Dimond disclosed a confined and limited writing area containing a plurality of visible guide indicia and a plurality of electrically conducting segments cooperating with the electrically conducting stylus to produce the desired coded signals. Various similar devices disclosing apparatus for generating a cognizable character code were disclosed in the U.S. Patents: No. 3,111,646, issued to Harmon; No. 3,128,340, issued to Harmon; No. 3,636,214, issued to Scott; No. 3,199,078, issued to Gaffney; No. 2,446,392, issued to Rey; No. 3,182,291, issued to Nassimbene; and No. 3,142,039, issued to Irland.

SUMMARY OF THE INVENTION

An object of the invention is to provide a code generating and receiving apparatus for generating an identifiable, recognizable indicia code indicative of various indicia such as character, letters, numbers, symbols or the like, as the indicia is written or marked on a writing surface.

Another object of the invention is to provide an improved writing instrument for generating indicia indicating signals responsive to directional movement thereof generally across a writing surface.

One other object of the invention is to provide an improved writing instrument for generating an identifiable, recognizable indicia code having an orientation compensating assembly constructed such that a predetermined indicia code is generated substantially independent of the orientation of the writing instrument generally about an axial axis therethrough.

An additional object of the invention is to provide an improved code generating and remote receiving apparatus having operator-perceivable feedback indications.

Yet another object of the invention is to provide an improved code generating apparatus constructed substantially reducing the possibility of inadvertent generation of indicia indicating signals during the operation thereof.

Still another object of the invention is to provide an improved code generating apparatus and receiving apparatus eliminating the necessity of interconnecting wires or the like therebetween.

One other object of the invention is to provide an improved code generating and receiving apparatus having a two-way communication between the code generating apparatus and the receiving apparatus.

Another object of the invention is to provide an improved code generating and receiving apparatus which is economical in construction and operation.

Other objects and advantages of the invention will be evident from the following detailed description when read in conjunction with the accompanying drawings which illustrate preferred embodiments of the invention.

BRIEF DESCRIPTION OF THE DRAWINGS

FIG. 1 is a partial sectional, partial side elevational view of a code generating apparatus constructed in accordance with the present invention.

FIG. 2 is an enlarged side elevational view of a portion of the code generating apparatus of FIG. 1, particularly showing a portion of the operator-perceivable indicating panel thereof.

FIG. 3 is an enlarged sectional view of a portion of the tip assembly of the code generating apparatus of FIG. 1.

FIG. 9 is a sectional view, similar to FIG. 3, but showing a modified tip assembly.

FIG. 10 is a sectional view of the bearing bearingly supporting the writing ball of another modified tip assembly.

DESCRIPTION OF THE PREFERRED EMBODIMENT

Figure 4:
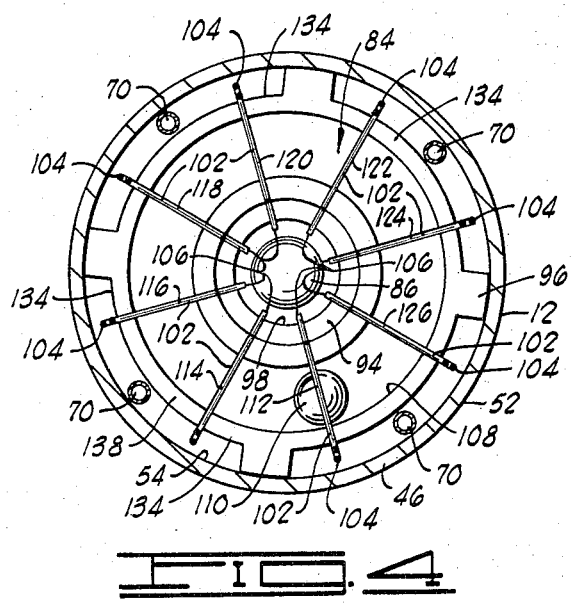
FIG. 4 is a top plan view of the portion of the tip assembly shown in FIG. 3 having the cap member removed therefrom.

Referring to the drawings in general, and to FIGS. 1 through 4 in particular, shown therein and designated by the reference numeral 10 is a code generating apparatus constructed in accordance with the present invention, the code generating apparatus 10 being, more particularly, constructed to be utilized for writing or marking indicia on a writing surface and simultaneously generating and transmitting indicia indicating signals forming an indicia code representing the marked indicia. As diagrammatically shown in FIG. 5, the code generating apparatus 10 includes a writing instrument 12 basically comprising: a signal generating network 14 for generating the indicia indicating signals as the indicia is marked by the writing instrument 12, the generated indicia indicating signal being connected to and transmitted from the writing instrument 12 via an antenna 16; a signal receiving network 18 connected to the antenna 16 and constructed to receive feedback signals via a feedback signal path 19 connected thereto; and a signal path 20 for connecting the received feedback signals 19 to a feedback network 21, the feedback network 21 being constructed to receive the feedback signals 19 via the signal path 20 and provide operator-perceivable feedback indicative of and responsive to the various feedback information, in a manner and for reasons which will be described in greater detail below.

In a preferred form, the indicia indicating signals generated and transmitted via the code generating apparatus 10 are received via a receiving apparatus 22 constructed to receive the indicia indicating signals and to identify and decipher the indicia code indicated thereby. More particularly, as diagrammatically shown in FIG. 5, the receiving apparatus 22 includes a receiver-transmitter 24, having a receiver portion connected to an antenna 26 and constructed for receiving the transmitt8d indicia indicating signals from the code generating apparatus 10 via the antenna 26, the received indicia indicating signals being connected to a code recognition network 28 via a signal path 30. The code recognition network 28 is constructed to receive the indicia indicating signals from the receiving portion of the receiver-transmitter 24 via the signal path 30 and to identify and decipher the indicia code represented by the indicia indicating signals, the code recognition network 28 being, in a preferred form, constructed to translate the deciphered indicia code into a form suitable for input into a general purpose digital computer or the like, for example.

The code recognition network 28 is also constructed, in one preferred form, to generate feedback signals indicative of predetermined information such as, for example, a code received signal indicating the transmitted indicia code has been received and deciphered via the code recognition network 28, a code cancel signal indicating that the code recognition network 28 has canceled the previously received indicia code, a signal indicative of the identified and deciphered code indicia, and a signal indicating that the code recognition network 28 is activated and positioned to receive, identify and decipher indicia indicating signals. The receiver-transmitter 24 includes a transmitter portion connected to the code recognition network 28 and constructed to receive the feedback signals therefrom via a signal path 32 connected therebetween, the transmitter portion transmitting the received feedback signals via the antenna 26. As mentioned above, the signal receiving network 18 is constructed to receive feedback signals via the feedback signal path 19 such as the feedback signal indicative of the received and deciphered indicia code, for example, and to connect the received feedback signals to the feedback network 21 via the signal path 20, the feedback network 21 providing operator-perceivable feedback indicative of the received feedback signal thereby informing the operator that receiving apparatus 22 has received a particular indicia and identifying the received indicia in a manner cognizable by the operator, in the instance of one of the feedback signals, for example, in a manner to be described in greater detail below.

It should be noted that the term "indicia" as used above and below indicates a letter of the alphabet, a symbol, character, line, numeral, or the like. In one other aspect, the term indicia is simply used to denote any type of information to be written by the operator and converted into a language cognizable via a general purpose digital computer or stored in electrical storage elements or the like for subsequent utilization in reproducing the stored information, for example. Further, the code generating apparatus 10 and the receiving apparatus 22 are sometimes referred to herein as an assembly and, more particularly, as the code generating and receiving apparatus 36.

Referring more particularly to the writing instrument of the present invention, as shown more clearly in FIGS. 1 through 4, the writing instrument 12 includes a housing assembly 38 having a tubular-shaped housing 40 with a hollow opening 42 extending a distance therethrough intersecting a writing end 44 thereof. The housing 40 is particularly constructed to supportingly retain the various portions of the code generating apparatus 10, and such that the housing 40 can be easily and conveniently held by an individual's hand in a normal writing position, as will be described in greater detail below.

The housing assembly 38 also includes a tip assembly 46 reciprocatingly disposed in a portion of the opening 42, a portion of the tip assembly 46 extending generally through the writing end 44 such that the tip assembly 46 is reciprocatable for a predetermined distance in a downwardly direction 48 and in an upwardly direction 50. More particularly, the tip assembly 46 includes a tip housing 52, having hollow portion 54 extending therethrough intersecting an upper end 56 and a lower end 58 thereof, a portion of the tip housing 52 generally near the upper end 56 thereof being reciprocatingly disposed within a portion of the opening 42 of the housing 40, as shown in FIG. 1. The lower end portion of the tip housing 52 is narrowingly tapered generally toward the lower end 58, as shown more clearly in FIGS. 1 and 3.

A plate 60, having an upwardly extending contact 62 secured to a central portion thereof, is securedly supported within the hollow portion 54 and spaced a distance from the upper end 56 of the tip housing 52. A plate 64, having a downwardly extending contact 66, is secured within the hollow portion 42 of the housing 40, spaced a distance from the writing end 44 thereof. The upwardly extending contact 62 and the downwardly extending contact 66 are each constructed of an electrically conductive material, in one preferred form, or coated with an electrically conductive material, in one other form, the plate 60 being secured and disposed in the tip housing 52 and the plate 62 being secured and disposed in the housing 40 such that the contacts 62 and 66 are generally aligned and spaced a distance apart, in a non-operating or inactive position of the writing instrument 12, as shown in FIG. 1.

A spring 68 is disposed between the plates 60 and 64, one end of the spring 68 being connected to the plate 60 and the opposite end of the spring 68 being connected to the plate 64. Thus, the spring 68 connects the tip assembly 46 to the housing 40 and is sized to support the tip assembly 46 in an inactive position wherein the contacts 62 and 66 are spaced a distance apart and to provide a biasing force resisting movement of the tip assembly 46 in a general direction 50. Each contact 62 and 66 is connected to the signal generating network 14 such that a code initiate signal is generated and transmitted when the tip assembly 46 is moved in the direction 50 against the biasing force of the spring 68 to a position wherein contacts 62 and 66 are moved into contacting engagement, the code initiate signal being terminated when the tip assembly 48 is biased by the spring 68 in a general direction 48 to a position breaking the contacting engagement between the contacts 62 and 66, for reasons which will be made more apparent below.

A plurality of tubes 70 (four tubes 70 being shown in FIG. 4, for example) are securely supported within the housing 40, each tube 70 extending a distance axially along the housing 40, generally near the wall formed therein via the hollow opening 42. One end portion of each of the tubes 70 extends past the writing end 44 of the housing 40 and through a portion of the hollow portion 54 of the tip housing 52. The end of each of the tubes 70 disposed within the tip housing 52 are, more particularly, disposed near a writing ball, each of the tubes 70 being constructed to retain a predetermined amount of writing fluid to be controllingly deposited generally upon the writing ball during the operation of the code generating and receiving apparatus 36, writing fluid supplies for depositing writing fluid on writing balls being generally well-known in the art.

As shown more clearly in FIG. 3, the tip assembly 46 includes a spherically shaped writing ball 74 which is journally disposed and rotatably supported within a bearing 76. The bearing 76 is, more particularly, secured within the hollow portion 54 of the tip housing 52, generally near the lower end 58 thereof, and a spherically shaped bearing surface 78 is formed through a central portion of the bearing 76, the bearing 76, the bearing surface 78, and the writing ball 74 each being shaped such that the writing ball 74 bearingly engages the bearing surface 78 and portions of the writing ball 74 extend generally above and generally below the bearing 76. The portion of the writing ball 74 extending below the bearing 76, more particularly, extends a sufficient distance below the lower end 58 of the tip housing 52 and is disposed to engage a writing surface during the operation of the code generating and receiving apparatus 36, and the portion of the writing ball 74 extending above the bearing 76, more particularly, extends a sufficient distance above the bearing 76 and is disposed to contact and engage a portion of a lower contact ball 80 of a contact arm assembly 82, for reasons to be described in greater detail below.

The contact arm assembly 82 is disposed and supported within a portion of the hollow portion 54 of the tip housing 52, and is constructed and disposed such that a portion thereof contactingly engages a portion of the writing ball 74 and another portion thereof engages predetermined portions of a code contact assembly 84, in a code generating position of the contact arm assembly 82. More particularly, the contact arm assembly 82 is disposed within the tip housing 52 and is constructed to contact predetermined portions of the code contact assembly 84 in response to rotational movement of the writing ball 74 and, more particularly, in response to directional movement of the writing instrument 12 generally across the writing surface in a code generating position of the writing instrument 12, the code contact assembly 84 being connected to the signal generating network 14 and cooperating therewith to generate the indicia indicating signals, in a manner to be described in greater detail below.

As shown more clearly in FIG. 3, the contact arm assembly 82 includes the lower contact ball 80, an upper contact ball 86 and a rod 88, one end of the rod 88 being connected to the lower contact ball 80 and the other end of the rod 88 being connected to the upper contact ball 86, the rod 88 thereby providing a rigid interconnection between the lower and the upper contact balls 80 and 86. In a preferred form, the upper contact ball 86 is constructed of an electrically conductive material or, in one other preferred form, the upper contact ball 86 is coated with an electrically conductive material, for reasons which will be made more apparent below.

The lower contact ball 80 is journally disposed and rotatingly supported within a bearing 90, the bearing 90 being secured within the hollow portion 54 of the tip housing 52, spaced a distance above the bearing 76 and the writing ball 74. A spherically shaped bearing surface 92 is formed in a central portion of the bearing 90, the bearing 90, the bearing surface 92 and the lower contact ball 80 each being shaped such that the bearing 90 journally supports the lower contact ball 80 generally above the writing ball 74 and portions of the lower contact ball 80 extend generally above and below the bearing 90. More particularly, the bearing 90 rotatingly supports the lower contact ball 80 such that a portion of the outer surface of the lower contact ball 80 extending below the bearing 90 contactingly engages a portion of the outer surface of the writing ball 74 extending generally above the bearing 76, the rod 88 being, more particularly, connected to the portion of the lower contact ball 80 extending generally above the bearing 90 and generally opposite the portion of the lower contact ball 80 contactingly engaging the writing ball 74, for reasons which will be made more apparent below.

The rod 88 extends generally upwardly from the lower contact ball 80, and through a resilient retainer 94, the retainer 94 being disposed about a portion of the rod 88 and constructed to support the rod 88 in a generally axially extending direction through the housing 40, yet resiliently supporting the rod 88 such that the rod 88 can be pivoted via the lower contact ball 80 during a code generating portion of the operation of the writing instrument 12. The retainer 94 is disposed and securely supported generally within a support 96, the support 96 being secured within a portion of the hollow portion 54 of the tip housing 52 generally above the bearing 90. An opening 98 is formed in a central portion of the support 96 and an annular recess 100 is formed in a portion of the wall of the support 96 formed by the opening 98 therein, a portion of the retainer 94 being disposed and secured in an assembled position generally within the recess 100. The retainer 94, thus, rigidly yet resiliently supports the contact arm assembly 82 such that the upper contact ball 86 is centrally disposed within a portion of the opening 98, in a manner and for reasons to be described in greater detail below.

The code contact assembly 84, more particularly, includes a plurality of upper conductors 102 and a plurality of lower conductors 104. One end portion of the upper and the lower conductors 102 and 104 are each disposed and securely supported within a portion of the support 96, and the end of each of the conductors 102 and 104 supported within the support 96 extends radially thereacross into a portion of the opening 98 forming what is sometimes referred to below as the "contact end 106" of the conductors 102 and 104. A portion of the contact end 106 portion of each upper conductor 102 is axially aligned and spaced and a predetermined distance axially from a portion of the contact end 106 portion of one of the lower conductors 104, as shown more clearly in FIG. 3. A portion of the contact end portions 106 of the conductors 102 and 104 are disposed within the opening 98 and spaced a distance from the upper contact ball 86 in an inactive or non-code generating position of the code generating apparatus, as shown in FIGS. 1, 3 and 4. The end of each of the conductors 102 and 104, generally opposite the contact ends 106 thereof, is connected to a portion of the signal generating network 14, the signal generating network 14 generating and transmitting indicia indicating signals indicative of the indicia being marked on the writing surface via the writing ball 74 in response to contacting engagement between a portion of the contact arm assembly 82 and predetermined portions of the code contact assembly 84, in a manner and for reasons to be made more apparent below.

As shown more clearly in FIGS. 3 and 4, an annular race 108 is formed in a portion of the support 96, and disposed such that the annular race 108 generally encircles the opening 98. A spherically shaped orientation member 110 is rollingly disposed in the annular race 108, the annular race 108 being shaped to retain and confine the orientation member 110 to a predetermined path of travel therein and the orientation member 110 being movably and rollingly supported within the annular race 108 to travel in a path generally 360° about the opening 98. In a preferred form, the orientation member 110 is constructed of an electrically conductive material such as mercury or copper of the like, or the orientation member 110 is coated with an electrically conductive material, in one other form, for reasons which will be made more apparent below.

The upper and the lower conductors 102 and 104 are constructed of an electrically conductive material, in a preferred form, and the contact end 106 portions of the conductors 102 and 104 are supported within the support 96 and circumferentially spaced about the opening 98 such that each upper conductor 102 cooperates with one of the lower conductors 104, axially aligned and disposed in a substantially common vertical plane therewith, to form cooperating pairs of conductors, the cooperating pairs of conductors being designated in the drawings by the reference numerals 112, 114, 116, 118, 120, 122, 124 and 126 for the purpose of identification and clarity of description.

As shown more clearly in FIG. 3, each of the upper conductors 102 extends across a portion of the annular race 108 and a portion of each of the upper conductors 102 is disposed generally within and over an upper portion of the annular race 108, the upper conductors 102 and the orientation member 110 each being sized and disposed such that a portion of the orientation member 110 contactingly engages a portion of the upper conductors 102 when the orientation member 110 is rollingly moved within the annular race 108 to a position generally aligned with the upper conductor 102 contactingly engaged thereby. Each of the lower conductors 104 extends across a lower portion of the annular race 108 and a portion of each of the lower conductors 104 is disposed generally within the annular race 108, the upper conductors 104 and the orientation member 110 each being sized and disposed such that a portion of the orientation member 110 contactingly engages a portion of one of the lower conductors 104 when the orientation member 110 is rollingly moved within the annular race 108 to a position generally aligned with the lower conductor 104 contactingly engaged thereby. Each of the pairs of conductors 112 through 126, inclusive, thus include an upper conductor 102 and a lower conductor 104, and the portion of each lower conductr 104 disposed within the annular race 108 is axially spaced a predetermined distance and generally aligned with a portion of one of the upper conductors 102 disposed within the annular race 108. Thus, each of the pairs of conductors 112 through 126, inclusive, and the orientation member 110 are disposed in the support 96, and the orientation member 110 is rollingly movable to predetermined positions within the annular race 108 such that the orientation member 110 contactingly engages a portion of the upper conductor 102 and a portion of the lower conductor 104 of one of the pairs of conductors 112 through 126, inclusive, in each position of the orientation member 110 within the annular race 108. It should be particularly noted that, in a preferred form, the code generating apparatus 10, more particularly, includes a plurality of pairs of conductors circumferentially spaced and oriented about the opening 98 or, more particularly, about the upper contact ball 86 and the annular race 108 and only eight pairs of conductors 112 through 126, inclusive, have been shown in the drawings for the purpose of clarity of description.

In one preferred form, and, as shown more clearly in FIG. 3, the support 96 includes a base member 128, a ring member 130 and a cap member 132. One portion of the opening 98 is formed through a central portion of the base member 128 and the recess 100 is formed in the portion of the wall of the base member 128 formed by the portion of the opening 98 extending therethrough. A portion of the opening 98 is formed through a central portion of the ring member 130, and a circumferentially shaped opening is formed through a portion of the ring member 130 generally between the wall formed in the ring member 130 by the portion of the opening 98 extending therethrough and the outer periphery of the ring member 130, the circumferentially oriented walls formed in the ring member 130 by the circumferentially shaped opening extending therethrough forming the circumferentially oriented side walls of the annular race 108 in an assembled position of the ring member 130. The ring member 130 is secured to the base member 128 and a portion of the base member 128 encompasses one end of the circumferentially shaped opening through the ring member 130 thereby forming the lowermost wall of the annular race 108, in an assembled position. The cap member 132 includes a circular shaped recess formed a distance through a central portion thereof, the circular shaped recess forming the uppermost end portion of the opening 98, and the cap member 132 being shaped and secured to the ring member 130 such that a portion of the cap member 132 extends over and encompasses one end of the circumferentially shaped opening through the ring member 130, a portion of the cap member 132 thus forming the uppermost wall of the annular race 108, in an assembled position.

As shown more clearly in FIG. 4, a plurality of arcuately shaped recesses 134 are formed in and spaced circumferentially in a portion of the outer periphery of the support 96 and, more particularly, the base member 128, the ring member 130 and the cap member 132. In a similar manner, a plurality of arcuately shaped, circumferentially spaced recesses are formed in a portion of the outer periphery of the bearing 90. The recesses 134 of the support 96 are each shaped and disposed to provide an opening through which the ends of the conductors 102 and 104, generally opposite the contact ends 106 thereof, extend axially upwardly through the hollow portion 54 of the tip housing 52 and through the hollow opening 42 of the housing 40 to be connected to a portion of the signal generating network 14, the recesses (not shown) in the outer periphery of the bearing 90 being, more particularly, shaped to accommodate a portion of the tubes 70.

Each of the tubes 70, more particularly, extends through one of the arcuately shaped recesses 134 in the support 96 and through one of the arcuately shaped recesses (not shown) formed in the outer periphery of the bearing 90 and through openings (not shown) formed in the bearing 76 to a position wherein one end of each of the tubes 70 is disposed generally adjacent a portion of the outer periphery of the writing ball 74. The ends of each of the tubes 70, disposed generally adjacent a portion of the outer periphery of the writing ball 74, each cooperate to deposit a predetermined amount of writing fluid on the outer periphery of the writing ball so that various indicia can be marked on a writing surface via the writing ball 74, as the writing ball 74 is moved across a writing surface in a code generating position of the code generating apparatus 10, as will be described in greater detail below.

Utilizing the three piece (the base member 128, the ring member 130 and the cap member 132) construction for the support 96, the contact end 106 portions of the lower conductors 104 are each secured in an assembled position on an upper face 136 portion of the base member 128. The ring member 130 is then secured in an assembled position on the upper face 136 of the base member 128, and the lower conductors 104 are thus interposed generally between the upper face 136 of the base member 128 and the ring member 130, the ring member 130 cooperating with the base member 128 to secure the contact end 106 portions of the lower conductors 104 in an assembled position between the base member 128 and the ring member 130. The upper conductors 102 are then disposed and secured in an assembled position on an upper face 138 of the ring member 130 and the cap member 132 is then secured to the upper face 138 of the ring member 130, the cap member 132 thus cooperating with the ring member 130 to secure the contact end 106 portions of the upper conductors 102 in an assembled position interposed generally between the ring member 130 and the cap member 132. In one form, the orientation member 110 is disposed in the annular race 108 prior to securing the contact end 106 portions of the upper conductors 102 and the cap member 132 in an assembled position with respect to the ring member 130. Thus, the base member 128, the ring member 130 and the cap member 132 are each constructed such that the upper conductors 102, the lower conductors 104 and the orientation member 110 can each be quickly and conveniently secured in an assembled position to form the support 96 in a relatively fast, convenient and efficient manner.

The contact arm assembly 82 and the code contact assembly 84 are each constructed such that the upper contact ball 86 is disposed within a portion of the opening 98 in the support 96, and the contact ends 106 of the upper and lower conductors 102 and 104 of each of the pairs of conductors 112 through 126, inclusive, are circumferentially disposed about the upper contact ball 86 and spaced a distance therefrom in an inactive or a non-code generating position of the writing instrument 12. The contact arm assembly 82 and code contact assembly 84 are also constructed such that the upper contact ball 86 is pivoted in a direction generally toward a portion of the wall formed in the support 96 by the opening 96 and into contacting engagement with the contact ends 106 of one of the pairs of conductors 112 through 126, inclusive, as the lower contact ball 80 is rotatingly moved within the bearing 90, the upper contact ball 86 being pivoted about the rotational axis of the lower contact ball 80 via the interconnecting rod 88 therebetween. Thus, rotational movement of the writing ball 74 is transferred to the lower contact ball 80 via the contacting engagement therebetween, and the imparted rotational movement of the lower contact ball 80 causes the upper contact ball 86 to be pivoted in a direction generally toward contacting engagement with the contact ends 106 of one of the pairs of conductors 112 through 126, inclusive, for reasons which will be made more apparent below.

Figure 5:
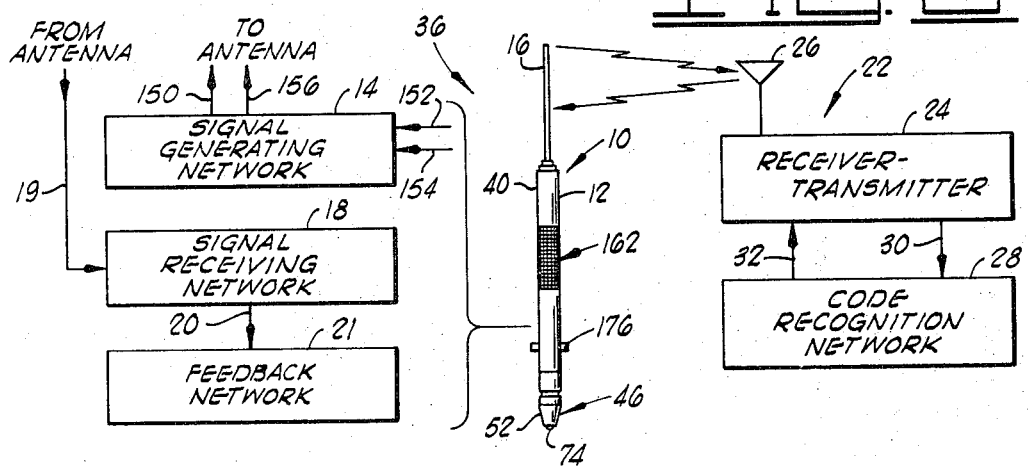
FIG. 5 is a partially diagrammatically, partially schematic, partially elevational view of the code generating and receiving apparatus of the present invention.

The ends of each of the conductors 102 and 104, generally opposite the contact ends 106 thereof, are each connected to a predetermined portion of the signal generating network 14 and the signal generating network 14 is constructed to generate and transmit a predetermined, decipherable, identifiable signal 150, as diagrammatically shown in FIG. 5, in response to a contacting engagement between the upper contact ball 86 and the contact ends 106 of one of the pairs of conductors 112 through 126, inclusive. Thus, the upper and the lower conductors 102 and 104 are each connected to a portion of the signal generating network 14 such that the contacting engagement between the contact ends 106 of one of the pairs of conductors 112 through 126, inclusive, and the uppermost contact ball 86 establishes electrical communication therebetween and activates a predetermined portion of the signal generating network 14 via the signal path 152, the signal generating network 14 being constructed to generate and transmit a predetermined indicia indicating signal 150 indicative of the contacting engagement between the upper contact ball 86 and one of the pairs of conductors 112 through 126, inclusive.

As mentioned before, the orientation member 110 contacts the upper and the lower conductors 102 and 104 of one of the pairs of conductors 112 through 126, inclusive, in each position of the orientation member 110 within the annular race 108, thereby activating a predetermined portion of the signal generating network 14 via the signal path 154. The signal generating network 14 is constructed to generate a predetermined orientation signal 156 in response to a received signal via the signal path 154 indicating the disposition of the orientation member 110 within the annular race 108. The orientation signal 156 is thus indicative of and responsive to the rotational orientation of the writing instrument 12 about an axial axis therethrough, during the operation of the code generating apparatus 10, and a predetermined number of orientation signals and the indicia indicating signals simultaneously generated comprise the indicia code indicative of the marked indicia, the orientation signals establishing a movable reference point for identifying the indicia indicating signals in a manner substantially independent of the orientation of the code generating apparatus, as will be described in greater detail below.

In a preferred form, the signal generating network 14 is disposed and supported within an upper portion 160 of the housing 40, and the power supply for operating the various components of the signal generating network 14, the signal receiving network 18 and the feedback network 21 are also disposed and supported within the upper portion 160 of the housing 40. The feedback network 21 includes an operator-perceivable indicating panel 162, as shown more clearly in FIGS. 1 and 2, and the feedback signals generated via the code recognition network 28, transmitted via the transmitter portion of the receiver-transmitter 24 are connected to the signal receiving network 18 of the code generating apparatus 10 via the feedback signal path 19 and activate predetermined, selected portions of the feedback network 21, as will be described in greater detail below.

The operator-perceivable indicating panel 162, in one preferred form, includes a plurality of cylindrically shaped sections 164, each cylindrically shaped section 164 being indicative of a predetermined feedback signal and lightable via a separate light source disposed therein such as a light emitting diode or the like, for example. More particularly, each light source disposed within the sections 164 is lightable via a separate predetermined, received feedback signal from the signal receiving network 18 to provide an operator-perceivable display indicative of the feedback information transmitted from the receiving apparatus 22 to the writing instrument 12, during the operation of the code generating and receiving apparatus 36. It should also be noted that the operator-perceivable indicating panel 162 can be constructed as a separate unit, in one form, which may be desirable in some applications.

As shown more clearly in FIG. 2, some of the cylindrically shaped sections 164 are inscribed with numerical indicia and some of the cylindrically shaped sections are inscribed and associated with alphabet or letter-indicating indicia, the illumination of one of the sections 164 thus inscribed with the numerical or letter indicia via the light source disposed therein in response to a predetermined feedback signal thus providing a visual, operator-perceivable feedback indication of the feedback signals. It should be noted that some of the cylindrically shaped sections 164 are color-coded such as the sections referred to in FIG. 2 by the numerals 166, 168 and 170, for example.

In one form, the color-coded section 166 is connected to the receiving network 18 and the feedback network 21 such that a lighted condition of the color-coded section 166 indicates that the receiving apparatus 22 has received and recognized a "cancel signal" generated and transmitted from the writing instrument 12, the cancel signal indicating that the previously generated indicia indicating signals have been canceled and not permanently entered into the code recognition network 28; the color-coded section 168 is connected to the signal receiving network 18 and the feedback network 21 such that a lighted condition of the color-coded section 168 indicates a "stop" condition or in other words that some malfunction has occurred in the code generating and receiving apparatus 36; the color-coded section 170 is connected to the signal receiving network 18 and the feedback network 21 to indicate a "go" condition indicating that the indicia indicating signals being generated and transmitted via the writing instrument 12 are being received via the receiving apparatus 22 and that the received indicia indicating signals are being entered into the code recognition network 28 to be subsequently deciphered and identified thereby, for example. In any event, the signal receiving network 18 and the feedback network 21 are each constructed to provide apparatus for receiving feedback signals from the receiving apparatus 22 and providing operator-perceivable feedback indicative of the received feedback signals from the receiving apparatus 22, the signal receiving network 18 and the feedback network 21 cooperating with the signal generating network 14 and the receiving apparatus 22 to provide a two-way communication between the code generating apparatus 10 and the receiving apparatus 22.

In a preferred form, and, as shown in the drawings, the signal generating network 14 also includes a cancel switch 174, as shown more clearly in FIG. 1, the cancel switch 174 being, in one form, a "slide-type" switch having a switch arm 176 disposed through an opening 178 formed through the housing 40, as shown more clearly in FIG. 1. The switch arm 176 is operator-movable in a downwardly direction to position the cancel switch 174 in an activated or closed position, the cancel switch 174 being connected to a portion of the signal generating network 14 to generate a code cancel signal in the activated or closed position of the cancel switch 174. The manually operated cancel switch 174 thus provides an assembly enabling the operator to cancel previously generated indicia indicating signals in a quick, efficient and convenient manner by simply moving the switch arm 176 in a downwardly direction to activate or close the cancel switch 174. Slide switches constructed in a manner described before with respect to the cancel switch 174 are commercially available and well-known in the art.

In one other preferred embodiment, the cancel switch 174 is constructed such that the switch arm 176 is movable in an upwardly direction to an activated or closed position. In this manner the writing instrument 12 is constructed such that the operator positions his fingers below the switch arm 176 in a writing or holding position and merely moves one of the fingers upwardly a relatively short distance to engage the switch arm 176 and activate the cancel switch 174.

In a preferred form, the indicia indicating signals, the cancel signal, the code initiate signal, and the feedback signals are each in the radio frequency range, the code generating apparatus 10 and the receiving apparatus 22 each being constructed to transmit and receive signals generally within the radio frequency range. In this manner, a two-way communication is established between the code generating apparatus 10 and the receiving apparatus 22 without the necessity of wire conductors or the like being connected therebetween, thereby physically limiting the freedom of movement of the writing instrument 12 during the operation of the code generating and receiving apparatus 36. Further, the utilization of signals generally within the radio frequency range to establish communication between the code generating apparatus 10 and the receiving apparatus 22 enables the receiving apparatus 22 to be constructed for simultaneously communicating with more than one code generating apparatus, each code generating apparatus being constructed similar to the code generating apparatus 10 in a more efficient, more economical and more convenient manner. In this last-mentioned form, each of the code generating apparatus is constructed to generate an identifying signal along with the indicia indicating signals, and the receiving apparatus 22 is constructed to also receive the identifying signal, the receiving apparatus 22 being constructed to correlate the identifying signals and the indicia indicating signals to identify the particular code generating apparatus 10 generating and transmitting the received indicia indicating signals. Thus, the code generating and receiving apparatus 36 includes a plurality of code generating apparatus or, more particularly, a plurality of writing instruments, in one embodiment, for reasons and in a manner described before.

Various aspects of the invention will be described and other aspects of the invention will be further described with reference to the operation of the code generating and receiving apparatus 36, described in detail below.

OPERATION OF THE PREFERRED EMBODIMENT

The code generating and receiving apparatus 36 is constructed to provide a fast, convenient, efficient, economical and reliable apparatus for marking an indicia on a writing surface or the like and simultaneously generating indicia indicating signals responsive to the mark indicia wherein the generated indicia indicating signals are transmitted from the code generating apparatus 10 and received by the receiving apparatus 22, the receiving apparatus 22 receiving the transmitted indicia indicating signals and deciphering and identifying the indicia code represented thereby. In a preferred form, the code generating apparatus 10 also includes apparatus for generating and transmitting orientation signals responsive to the orientation of the code generating apparatus 10, a predetermined number of orientation signals and the indicia indicating signals simultaneously generated comprising the indicia code, the orientation signals establishing a movable reference point for identifying the sequence of indicia indicating signals substantially independent of the orientation of the code generating apparatus 10. The code generating and receiving apparatus 36 includes apparatus for establishing a two-way communication between the code generating apparatus 10 and the receiving apparatus 22 such that the code generating and receiving apparatus 36 not only provides an apparatus for generating and transmitting indicia indicating signals to be received by the receiving apparatus 22; but, also provides apparatus for generating and transmitting feedback signals from the receiving apparatus 22 to the code generating apparatus 10, the code generating apparatus 10 having an assembly for receiving the generated and transmitted feedback signals from the receiving apparatus 22 and providing an operator-perceivable indication indicative of the received feedback signals 19 in a fast, convenient, efficient, economical and reliable manner.

During the operation of the code generating and receiving apparatus 36, the operator initially moves the writing instrument 12 to an initial position wherein the writing ball 74 of the tip assembly 46 is disposed generally above the writing surface. The operator will then move the writing instrument 12 downwardly toward the writing surface moving the writing ball 74 into contacting engagement with the writing surface. As the writing instrument 12 is moved toward the writing surface moving the writing ball 74 into contacting engagement therewith, the upper end 56 portion of the tip housing 52 is reciprocated in an upwardly direction 50 within the hollow opening 42 of the housing 40 moving the upwardly extending contact 62 into contacting engagement with the downwardly extending contact 66, thereby positioning the writing instrument in what is sometimes referred to below as the "marking position"; that is, a position wherein the code generating apparatus 10 is positioned in engagement within the writing surface for marking indicia thereon and the code initiate signal has been generated, transmitted and received thereby activating the receiving apparatus 22 for receiving and deciphering the indicia indicating signals.

The upwardly extending contact 62 and the downwardly extending contact 66 are each connected to the signal generating network 14, and the portion of the signal generating network 14 connected thereto is constructed to generate and transmit via the antenna 16 the code initiate signal in response thereto. A portion of the code recognition network 28 receives the code initiate signal from the receiver portion of the receiver-transmitter 24 via the signal path 30, and is activated and positioned to receive the subsequently generated and transmitted indicia indicating signals and to decipher and identify the indicia code represented thereby.

It should be particularly noted at this point that the contacting engagement between the writing ball 74 and the writing surface does not initiate pivotal movement of the contact arm assembly 82 to pivotally move the upper contact ball 86 into contacting engagement with a portion of the code contact assembly 84, since a mere pressure acting against the writing ball 74 in a vertically upwardly direction or angularly oriented direction will not cause the writing ball 74 to be rotated within the bearing 76. Thus, the writing instrument 12 is constructed such that indicia indicating signals are not generated and transmitted via the code generating apparatus 10 when the writing instrument 12 is held in a stationary, vertically oriented or angularly oriented position by the operator; but rather the writing instrument 12 is constructed to generate and transmit indicia indicating signals responsive to directional movement of the writing instrument 12 generally across the writing surface in a marking position thereof or, in other words, during the rotation of the writing ball 74. Since the contact arm assembly 82 and the code contact assembly 84 are each constructed and connected to the signal generating network 14 to generate indicia indicating signals in response to directional movement of the writing instrument 12 across the writing surface or, in other words, in response to rotational movement of the writing ball 74, the writing instrument 12 generates and transmits indicia indicating signals in response to an indicia being marked on the writing surface via the writing ball 74, thereby substantially preventing inadvertent, erroneous indicia indicating signals being generated and transmitted via the code generating apparatus 10 in response to directional pressure being applied to the writing ball 74 via the engagement between the writing ball 74 and the writing surface. Thus, the construction of the code generating apparatus 10 virtually assures that the indicia indicating signals will be generated and transmitted only when an indicia is being marked on the writing surface.

The signal generated and transmitted via the receiving apparatus 22 in response to the received code initiate signal is received by the feedback network 21 via the feedback signal path 19, the signal receiving network 18 and the signal path 20 of the code generating apparatus 10, the feedback network 21 providing an operator-perceivable feedback indication indicating that the code initiate signal has been received by the receiving apparatus 22 and the receiving apparatus 22 is positioned in a code receiving position. In one form, the feedback network 21 is constructed to illuminate the color-coded section 170 in response to the received feedback signal indicating that the received apparatus 22 has received the code initiate signal, the illumination of the color-coded section 170 providing the operator-perceivable feedback indication thereof.

As the operator moves the writing instrument 12 over a portion of the writing surface in a marking position thereof, the writing fluid deposited on the writing ball 74 via the tubes 70 is deposited on the writing surface via the writing ball 74, the writing ball 74 thereby marking a visible indicia or indicia portion on the writing surface and the writing ball 74 being simultaneously rotated within the bearing 76. The rotational movement of the writing ball 74 is translated to the lower contact ball 80 of the contact arm assembly 82 via the contacting engagement therebetween, thereby rotatingly moving the lower contact ball 80 within the bearing 76.

The rotational movement of the writing ball 74 as the writing instrument 12 is moved across the writing surface in a marking position of the writing instrument 12 to mark an indicia portion on the writing surface thus rotates the lower contact ball 80 and, since the upper contact ball 86 is rigidly connected to the lower contact ball 80 via a rod 88 extending therebetween, the upper contact ball 86 is pivoted in response to the rotational movement of the lower contact ball 80, generally about the rotational axis of the lower contact ball 80. More particularly, the upper contact ball 86 will be pivoted via the rotational movement of the lower contact ball 80 generally toward a portion of the code contact assembly 84 and into contacting engagement with one of the pairs of conductors 112 through 126, inclusive, of the code contact assembly 84. Thus, the contact arm assembly 82 contactingly engages a portion of the code contact assembly 84 in response to and indicative of the rotational movement of the writing ball 74, the contacting engagement between the upper contact ball 86 and one of the pairs of conductors 112 through 126, inclusive, establishing electrical continuity between the upper conductor 102 and the lower conductor 104 of the contacted pair of conductors and connecting a signal to the signal generating network 14 via the signal path 152 indicative of the direction of movement of the writing instrument 12 and, more particularly, indicative of the rotational directional movement of the writing ball 74 thereof. The signal generating network 14 generates and transmits via the antenna 16 indicia indicating signal via the signal path 150 responsive to the signal received via the signal path 152, and the receiving apparatus 22 receives the generated, transmitted indicia indicating signal from the code generating apparatus 10 via the receiver portion of the receiver-transmitter 24, the received indicia indicating signal being connected to the code recognition network 28 via the signal path 30.

The writing instrument 12 will continue to generate and transmit a particular indicia indicating signal so long as the upper contact ball 86 remains in contacting engagement with one of the pairs of conductors 112 through 126, inclusive, of the code contact assembly 84 or, in other words, so long as the writing ball 74 is being moved in one particular, constant direction across the writing surface. When the operator moves the writing instrument 12 to change the direction of movement thereof, the direction of rotation of the writing ball 74 will be changed in response thereto, the rotational movement of the lower contact ball 80 being changed via the change in the rotational movement of the writing ball 74 pivoting the upper contact ball 86 into contacting engagement with one of the other pairs of conductors 112 through 126, inclusive, of the code contact assembly 84. The subsequent contacting engagement between the upper contact ball 86 of the contact arm assembly 82 and the code contact assembly 84 resulting in a different or second signal 152 being connected to the signal generating network 14, the signal generating network 14 cooperating with the code contact assembly 84 generating and transmitting a different, identifiable indicia indicating signal via the signal path 150 indicative of the change in direction of the writing instrument 12, or, more particularly, indicative of the second or subsequent direction of the rotational movement of the writing ball 74.

The operator will continue to move the writing instrument 12 generally across the writing surface in a marking position thereof while simultaneously changing the direction of movement of the writing instrument 12 to form and mark a preselected, predetermined indicia on the writing surface. As the direction of movement of the writing instrument 12 is changed by the operator to mark and form the preselected indicia, the contact arm assembly 82 is pivoted via the lower contact ball 80 sequentially bringing the upper contact ball 86 into contacting engagement with a plurality of the pairs of conductors 112 through 126, inclusive, of the code contact assembly 84, the signal generating network 14 being thereby activated to generate and transmit a plurality of indicia indicating signals following the sequential contacting between the contact arm assembly 82 and portions of the code contact assembly 84. It should be noted that the position of the writing instrument 12 on the writing surface while being moved to mark a predetermined indicia is sometimes referred to herein as the "code generating position".

The indicia indicating signals and the sequence of the indicia indicating signal form the indicia code which is deciphered via a code recognition network 28, thereby identifying the indicia represented by the indicia code such as the letter, numeral, line, or the like, assuming the orientation of the writing instrument 12 about an axial axis extending therethrough remains constant, or, in other words, assuming the writing instrument 12 is held by the operator in one predetermined position at all times during the generation and transmission of the indicia indicating signals and further assuming the orientation of the writing instrument 12 is known and programmed into the code recognition network 28. However, it is considered to be more comfortable and more efficient for an operator to hold the writing instrument 12 at an angular position with respect to the writing surface (sometimes referred to herein as a "normal writing position"), and it is considered to be generally impractical and much less reliable to rely on the operator or some mechanical apparatus to maintain the writing instrument 12 oriented about an axial axis extending therethrough in an identical, predetermined orientation throughout the generation and transmission of the indicia indicating signals. The code generating apparatus 10, and, more particularly, the writing instrument 12 is thus constructed such that the operator can hold the writing instrument 12 in a marking position angularly oriented with respect to the writing surface, and the orientation member 110 is movably positioned within the annular race 108 to establish a reference point for identifying and establishing a recognizable, decipherable sequence of contacts between the contact arm assembly 82 and the pairs of conductors 112 through 126, inclusive. In this manner, the code generating apparatus 10 generates and transmits an identifiable, recognizable and decipherable sequence of indicia indicating signals in any orientation of the writing instrument 12 about an axial axis extending therethrough, thereby providing what may be referred to as a self-compensating orientation assembly wherein the sequence of contacts between the contact arm assembly 82 and the pairs of conductors 112 through 126, inclusive, of the code contact assembly 84 is referenced to a movable reference point via the orientation member 110, the movable reference point being determined by the angular orientation of the writing instrument 12 with respect to the writing surface and the orientation of the writing instrument 12 about an axial axis extending therethrough in a marking position and in a code generating position thereof during the generation and transmission of the indicia indicating signals. The code generating apparatus 10 thus generates and transmits orientation signals simultaneously with the generation and transmission of the indicia indicating signals, a predetermined number of the orientation signals and the simultaneously generated indicia indicating signals comprising the indicia code, in a preferred form.

When the operator has marked the preselected, predetermined indicia on the writing surface, the operator will lift or move the writing instrument 12 in a generally vertically, upwardly direction 50, thereby breaking the contacting engagement between the writing ball 74 and the writing surface. When the writing instrument 12 is moved from contacting engagement with the writing surface, the spring 68 will bias the tip housing 52 of the tip assembly 46 in a generally downwardly direction 48, thereby biasing the upwardly extending contact 62 in a direction 48 generally away from the downwardly extending contact 62 and breaking the contacting engagement therebetween. When the upwardly extending contact 62 is biasingly moved from contacting engagement with the downwardly extending contact 66, the code initiate signal is terminated, thereby indicating the end or termination of one particular, preselected, predetermined indicia code. In other words, the writing instrument 12 is initially moved to a marking position bringing the upwardly extending contact 62 into contacting engagement with the downwardly extending contact 66 and initiating the code initiate signal; the writing instrument 12 is then moved across the writing surface to form and mark a preselected, predetermined indicia thereon via the writing fluid deposited on the writing ball 74 and the contacting connection between the writing ball 74 and the contact arm assembly 82 pivotally moves the contact arm assembly 82 into sequential contacting engagement with predetermined portions of the code contact assembly 84, each contacting engagement between the contact arm assembly 82 and the code contact assembly 84 indicating a portion of an indicia mark being made on the writing surface. The sequence of the contacting engagement between the contact arm assembly 82 and the various pairs of conductors 112 through 126, inclusive, of the code contact assembly 84 and, more particularly, the resulting indicia indicating signals generated and transmitted via the signal generating network 14 in response to the contacting engagements establishes a portion of the indicia code indicating the direction of travel of the writing instrument 12 while forming the preselected, predetermined indicia.

The various indicia indicating signals generated and transmitted via the code generating apparatus 10 during the forming and marking of the indicia along with the code initiate signals indicating the initiation and the termination of a particular, preselected indicia code are all received by the receiver portion of the receiver-transmitter 24 and connected to the code recognition network 28 of the receiving apparatus 22. The code recognition network 28 identifies the indicia indicating signals generated and transmitted between the code initiate signals indicating the initiation and the termination of the preselected, predetermined indicia code and is constructed to identify the indicia represented by the indicia indicating signals therebetween or, in other words, the indicia code. After the code recognition network 28 has identified the particular indicia indicated by the indicia code, the code recognition network 28 generates the feedback signal indicative of the identified, deciphered indicia code, the feedback signal being connected to the transmitter portion of the receiver-transmitter 24 via the signal path 32 and transmitted via the antenna 26. The generated and transmitted feedback signal indicative of the deciphered and identified indicia code is received via the antenna 16 and connected to the signal receiving network 18 via the signal path 19 of the code generating apparatus 10, the feedback signal being connected to the feedback network 21 via the signal path 20. The feedback network 21 then provides an operator-perceivable feedback indication of the deciphered and identified indicia code received by the code recognition network 28 of the receiving apparatus 22. In one form, the feedback network 21 is constructed to illuminate one of the cylindrically shaped sections 164 via a light-emitting diode or the like in response to the received feedback signal indicative of the deciphered and identified indicia code, thereby providing the operator-perceivable feedback indication of the deciphered indicia code.

During the operation of the code generating and receiving apparatus 36, should the operator receive a feedback signal 19 indicating that the code recognition network 28 has received, deciphered and identified an indicia code which is not the indicia code the operator was attempting to transmit, the operator merely moves the switch arm 176 in a generally downwardly direction activating the cancel switch 174. In the activated position of the cancel switch 174, the signal generating network 14 generates and transmits the cancel signal which is received via the receiving apparatus 22, the receiving apparatus 22 canceling the indicia code previously received in response to the received cancel signal from the code generating apparatus 10. In one form, the receiving apparatus 22 transmits a cancel signal received feedback signal in response to a received cancel signal from the code generating apparatus 10, and feedback network 21 of the code generating apparatus 10 receives the cancel signal received feedback signal via the signal path 19, the signal receiving network 18 and the signal path 20, the feedback network 21 providing an operator-perceivable feedback indication indicating that the cancel signal was received and the subsequently transmitted indicia code has been canceled via the receiving apparatus 22. In this last-mentioned form, the color-coded section 166 is illuminated via the feedback network 21 in response to a received cancel signal received feedback signal 19, thereby providing the operator-perceivable feedback indication thereof.

Figure 6:
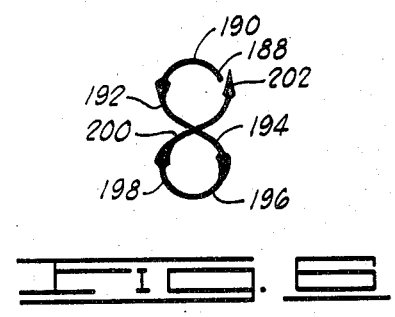
FIG. 6 is a diagrammatical view of the numeral 8 marked with the code generating apparatus of FIG. 1 and indicating the directional movement of the code generating apparatus during the marking of the numeral 8, for example.

The operation of the code generating and receiving apparatus 36 is, more particularly, diagrammatically illustrated in the drawings with reference to one particular indicia, the numeral 8, as shown in FIG. 6. A portion of the contact arm assembly 82 and a portion of the code contact assembly 84 is diagrammatically shown in FIG. 7 with respect to one orientation of the writing instrument 12 generally about an axial axis extending therethrough and a portion of the contact arm assembly 82 and a portion of the code contact assembly 84 is diagrammatically shown in FIG. 8 with respect to one other orientation of the writing instrument 12 about an axial axis extending therethrough.

As shown in FIG. 6, the indicia 8 is formed by initially positioning the writing instrument 12 in a marking position on the writing surface at a starting position 188, thereby moving the contacts 62 and 66 into contacting engagement and generating the code initiate signal in a manner described before. The writing instrument 12 is then moved in a direction forming the portion 190 of the indicia 8; the direction of the writing instrument 12 is then changed and moved in a direction forming the portion 192 of the indicia 8; the direction of the writing instrument 12 is then changed and moved in a direction forming the portion 194 of the indicia 8; the direction of movement of the writing instrument 12 is then changed and moved in a direction forming the portion 196 of the indicia 8; the direction of movement of the writing instrument 12 is then again changed and moved in a direction forming the portion 198 of the indicia 8; and finally the direction of the movement of the writing instrument 12 is changed and moved in a direction forming the portion 200 of the indicia 8, the writing instrument 12 being finally positioned at a terminating position 202. As the writing instrument 12 is being moved generally across the writing surface in a marking position thereof to form the portions 190, 192, 194, 196, 198 and 200, indicia indicating signals are being generated and transmitted via the code generating apparatus 10 and, more particularly, a separate indicia indicating signal is generated and transmitted as the writing instrument 12 is moved from the starting position 188 to the terminating position 202 to form each portion 190 through 200 of the indicia 8. At the position 202, the writing instrument 12 is moved in a vertically upwardly direction or, in other words, removed from the marking position thereof, thereby breaking the contacting engagement between the contacts 62 and 66 terminating the code initiate signal indicating the termination of a particular, predetermined, preselected indicia code. The indicia indicating signals generated between the code initiate signal and the termination of the code initiate signal representing the indicia code to be deciphered and identified by the code recognition network 28 of the receiving apparatus 22.

Figure 7:
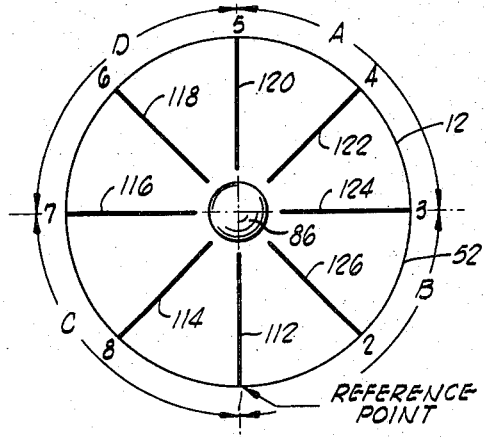
FIG. 7 is a schematic view of a portion of the contact arm assembly and a portion of the code contact assembly of the code generating assembly illustrating a portion of the operation in one position thereof.

Assuming the writing instrument 12 is angularly oriented with respect to the writing surface in a position wherein the pair of contacts 112 is disposed generally near the portion of the housing 40 positioned in closest proximity to the writing surface with respect to the remaining pairs of conductors 114 through 126, inclusive, the orientation member 110 will be rollingly moved via gravity within the annular race 108 to a position wherein the orientation member 110 contactingly engages the upper conductor 102 and the lower conductor 104 of the pair of conductors 112, the orientation member 110 being, more particularly, rollingly moved via gravity to the lowest position in the race 108 with respect to the writing surface. The contacting engagement between the orientation member 110 and the pair of conductors 112 of the code contact assembly 84 causes an orientation signal to be connected to the signal generating network 14 via the signal path 154, the orientation signal indicating that the orientation member 110 is in contacting engagement with the pair of conductors 112 and establishing the pair of conductors 112 as the reference point in this particular orientation of the writing instrument 12 (this particular orientation of the writing instrument 12 being diagrammatically shown in FIG. 7). As shown in FIG. 7, the pairs of conductors 112 and 120 are oriented generally along one center line and the pairs of conductors 116 and 124 are oriented generally along a second center line, extending transversely with respect to the first center line. The first center line and the second center line establish four sectors, the sectors being designated in FIG. 7 by the letters "A", "B", "C", and "D" and utilized to form the indicia code, in a manner to be described in greater detail below with particular reference to the indicia 8. The positions of the orientation ball 110 are identified by the reference numerals "1" through "8", inclusive, in FIGS. 7 and 8, the reference points referring to the particular pairs of conductors 112 through 126, inclusive, contacted by the orientation member 110 during the operation for the purpose of clarity of description.

As the writing instrument 12 is moved in a direction to form portion 190 of the indicia 8, the writing ball 74 will be rotated and the rotational movement thereof will be translated to the contact arm assembly 82, the contact arm assembly 82 being pivoted in a direction causing the upper contact ball 86 to contactingly engage the pair of conductors 126 of the code contact assembly 84. In this position, the contacting engagement between the orientation member 110 and the pairs of conductors 112 (a position 1 of the orientation member 110, as shown in FIG. 7) causes the generation of an orientation signal indicative of the position 1 of the orientation member 110, which is subsequently transmitted via the signal generating network 14 and the antenna 16. Further, in this position, the contacting engagement between the upper contact ball 86 of the contact arm assembly 82 and the pairs of conductors 126 connects a signal via the signal path 154 to the signal generating network 14, which generates and transmits an indicia indicating signal 150 via the antenna 16 in response thereto. The two signals generated and transmitted via the writing instrument 12 as the writing instrument 12 is being moved over the writing surface to form the portion 190 of the indicia 8 can be identified via the pairs of conductors contacted and the position of the orientation member 110 for the purpose of clarity of description and identification, the signals being designated by a first number indicating the pairs of conductors contacted or, in other words, the position of the orientation member 110 and a second number indicating pairs of conductors contacted by the contact arm assembly 82. Thus, utilizing the last-mentioned form of designation for the signals generated and transmitted via the writing instrument 12, the writing instrument 12 generates and transmits a signal (1) (126) as the writing instrument is moved to form the portion 190 of the indicia 8.

As the writing instrument 12 is moved to mark and form the remaining portions 192, 194, 196, 198 and 200 of the indicia 8, the contact arm assembly 82 is pivoted via the rotational movement of the writing ball 74 to contact in sequence the pairs of conductors 122, 118, 122, 126 and 114 and, assuming the orientation member 110 remains at position 1 contacting the pair of conductors 112, the writing instrument 12 generates and transmits the following sequence of signals:

(1) (122); (1) (118); (1) (122); (1) (126); and (1) (114).

The writing instrument 12 is finally moved to the terminating position 202 and removed from contacting engagement with the writing surface, thereby breaking the contacting engagement between the contacts 62 and 66 and indicating the termination of the indicia code. Thus, utilizing the above form for designating the signals, the signals generated and transmitted during the marking of the indicia 8 are designated as follows:

(1) (126) - (1) (122) - (1) (118) - (1) (122) - (1) (126) - (1) (114)

(1)

Since each indicia indicating signal is associated with a simultaneously generated and transmitted orientation signal indicating the orientation of the writing instrument 12 or, more particularly, indicating the orientation or position of the orientation member 110, the sector A, B, C or D associated with each of the generated and transmitted signals is identifiable and recognizable by the code recognition network 28. For example, referring to the signal designations (1) above generated and transmitted during the forming and marking of the indicia 8, the sectors associated with the generated and transmitted signals are identified and designated as follows:

B - A - D - A - B - C (2)

Thus, the code recognition network 28 is, more particularly, constructed to receive the indicia indicating signals and the orientation signals and identify the sequence of sectors in which the contacting engagement between the upper contact ball 86 and the pairs of conductors 112 through 126, inclusive, occurred during the marking of a preselected indicia, the sequence of sectors comprising the indicia code representing the marked indicia. In this manner, an indicia code is generated and transmitted which is virtually independent of the orientation of the writing instrument 12 about an axial axis extending therethrough.

Figure 8:
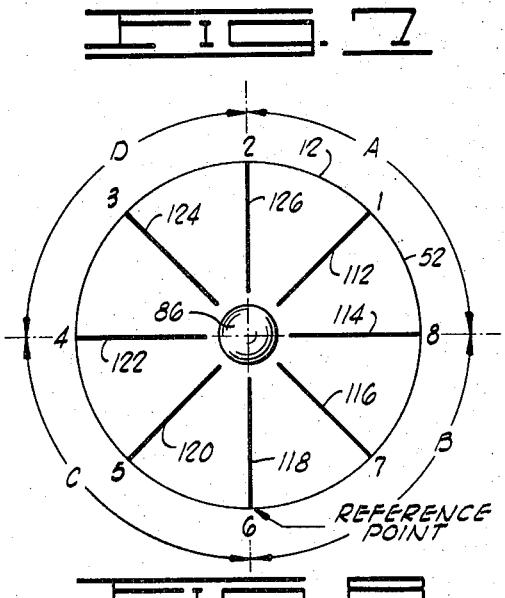
FIG. 8 is a schematic view, similar to FIG. 7, but showing a portion of the contact arm assembly and a portion of the code contact assembly illustrating a portion of the operation in one other position thereof.

To further demonstrate the utilization of the sectors to identify and designate the indicia code, assume the writing instrument 12 is oriented such that the orientation member 110 moves into contacting engagement with the pairs of conductors 118 or, in other words, moves to position 6, as shown in FIG. 8. In this position of the writing instrument 12, the following sequence of signals will be generated and transmitted via the writing instrument 12 during the forming and marking of the indicia 8, in a manner similar to that described before with respect to FIG. 7 and the signal designation (1) above.

(6) (116) - (6) (112) - (6) (124) - (6) (112) - (6) (116) - (6) (120)

(3)

The sectors of contacting engagement between the upper contact ball 86 and the code contact assembly 84 with respect to the signal designations (3) above are designated as follows:

B - A - D - A - B - C (4)

Referring to the sector designations (2) and (4) above, it will be noted that the sector designations are identical or, in other words, the sequence of sector designations for forming and marking the indicia 8 are identical with respect to the orientations of the writing instrument 12, shown in FIGS. 7 and 8. The code generating and receiving apparatus 36 thus generates and transmits an indicia code substantially independent of the orientation of the writing instrument 12.

It should be noted that, although the code generating and receiving apparatus 36 is shown in the drawings as having only eight pairs of conductors and only four sectors are utilized in forming the indicia code, additional pairs of conductors and additional sectors can be utilized in any one embodiment of the invention, the precise numbers being limited only by the physical size of the writing instrument 12 and degree of accuracy required in any one particular application. Also, although the invention has been described herein with particular reference to establishing a two-way communication between a code generating apparatus and a receiving apparatus via signals generally within the radio frequency range, many aspects of the invention are equally applicable to apparatus wherein communication is established via wire conductors or the like connected between the code generating apparatus and the receiving apparatus. The various applications and the construction of the apparatus to incorporate various aspects of the invention described herein will be evident to those skilled in the art in view of the detailed description of the invention contained herein. Finally, it should be noted that the term "writing surface" is utilized herein to denote any surface capable of receiving a mark from the writing instrument 12, such as ordinary paper or the like, the code generating and receiving apparatus being particularly constructed to eliminate the design requirement of having to utilize a specially constructed writing surface during the operation thereof.

EMBODIMENT OF FIG. 9

Shown in FIG. 9 is a modified writing instrument 12a, constructed similar to the writing instrument 12 described before; but including a modified tip assembly 46a having a modified writing ball 210 with a writing surface 212 formed on a portion thereof, the writing surface 212 being treated via mechanical, chemical or other means for enhancing the attraction between the writing fluid and the writing surface 212, and connected directly to the upper contact ball 86 via and rod 214 extending therebetween. The writing instrument 12 will operate to form and mark an indicia on a writing surface and simultaneously generate indicia indicating signals and orientation signals in a manner similar to that described before with respect to the code generating apparatus 10, the salient difference being that the rotational movement of the writing ball 210 during the marking of the indicia is limited via the rigid interconnection between the writing ball 210 and the upper contact ball 86. Thus, the writing ball 210 is an integral portion of the contact arm assembly 82 and cooperates to eliminate the necessity of including the lower contact ball 80 and the bearing 90 which may be desirable in some applications. However, it should be noted that, since the writing ball 210 is connected directly to the upper contact ball 86, the contact between the upper contact ball 86 and the pairs of conductors 112 through 126, inclusive, will be approximately 180° out-of-phase with respect to the contact sequence and sector designations described before with respect to the writing instrument 12 where the movement of the upper contact ball 86 was translated through the lower contact ball 80.

The writing surface 212 is included to augment and facilitate the attraction between the writing fluid and the writing ball 210 as the writing fluid is deposited thereon from the tubes 70, in a manner described before. The modified orientation member 110a is constructed of a mercury of similar electrically conductive type of fluid; but, otherwise functions and operates in a manner similar to that described before with respect to the orientation member 110.

EMBODIMENT OF FIG. 10

Shown in FIG. 10 is another modified writing instrument 12b, constructed similar to the writing instrument 12 described before, the salient differences being that the writing instrument 12b includes a modified tip housing 46b having a modified bearing 76b secured therein. The bearing 76b includes a pair of openings 214 and 216, each opening 214 and 216 being formed in the bearing 76b and having one portion thereof intersecting the opening formed by the bearing surface 78. The opening 214 is oriented with respect to the writing ball 74 at a position substantially 90° from the opening 216.

The writing instrument 12b includes a pair of cylindrically shaped wheels 218 and 220, the wheel 218 being rotatingly supported within the opening 214 via a shaft 222 and the wheel 220 being rotatingly supported within the opening 216 via a shaft 224. A plurality of strips 226 are secured to the outer periphery of the wheel 218, each strip 226 being constructed of a magnetic material and spaced a predetermined distance from the adjacent strips 226. In a similar manner, a plurality of strips 228 are secured to the outer periphery of the wheel 220, each strip 228 being constructed of a magnetic material and spaced a predetermined distance from the adjacent strips 226. In one form, the openings 214 and 216 are each shaped to cooperate with the wheels 218 and 220 to bearingly and rotatingly support the wheels 218 and 220, thereby eliminating the necessity of including shafts and separate bearing supports which may be desirable in some applications.

A pair of magnetic detectors 230 and 232 are secured within a portion of the tip housing 46b or, more particularly, within a portion of bearing 76b, the magnetic detector 230 being disposed generally adjacent the outer periphery of the wheel 218 and positioned to detect the strips 226 of magnetic material on the outer periphery thereof and the magnetic detector 232 being disposed generally adjacent the outer periphery of the wheel 220 and positioned to detect the strips 226 of magnetic material on the outer periphery thereof. Each magnetic detector 230 and 232, sometimes referred to herein as the detectors 230 and 232, is constructed to provide an output signal indicative of the number of strips 226 and 228 passing thereby during the rotation of the wheels 230 and 232, the output signal being connected to the signal generating network 14 and transmitted thereby, for reasons to be described in greater detail below.

Each wheel 218 and 220 is, more particularly, supported and positioned such that a portion thereof extends into a portion of the opening formed by the bearing surface 92 and contactingly engages a portion of the outer periphery of the writing ball 74, as shown in FIG. 10. Thus, the rotational movement of the writing ball 74 is translated to the wheels 218 and 220 via the contacting engagement therebetween, thereby rotating the wheels 218 and 220 in response to the rotational movement of the writing ball 74.

During the operation of a modified code generating and receiving apparatus having the modified tip assembly 46b, the moving of the writing instrument 12 across or over a portion of the writing surface to mark a preselected indicia thereof will cause the writing ball 74 to rotate within the bearing 76b, in a manner described before with respect to the code generating and receiving apparatus 10. The rotational movement of the writing ball 74 causes one or both of the wheels 218 and 220 to be rotated about their respective shafts 222 and 224. As the wheels 218 and 220 are rotated via the writing ball 74, the magnetic strips 226 and 228 are each detected by one of the magnetic detectors 230 and 232, the magnetic detectors 230 and 232 providing an output signal indicative of the detected strips 226 and 228, and being thus indicative of the amount of rotational movement of the wheels 218 and 220. Further, since the rotational movement of the wheels 218 and 220 is caused via the rotation of the writing ball 74, the output signal of the detectors 230 and 232 is responsive to and indicative of the amount of rotational movement of the writing ball 74, the rotational movement of the writing ball 74 being caused via the engagement between the writing ball 74 and the writing surface as an indicia is being marked and thus the output signal of the detectors 230 and 232 being, more particularly, responsive to and indicative of the distance traveled by the writing instrument 12 during the marking of the indicia on the writing surface.

The receiving apparatus 22 is constructed to receive transmitted signals responsive to and indicative of the output signals of the detectors 230 and 232, sometimes referred to herein as the distance signals, and to connect the received distance signals to the code recognition network 28. The code recognition network 28 correlates the received indicia indicating signals, the received orientation signals and the received distance signals, and identifies and deciphers the indicia represented thereby, including the distance or length of the identified indicia.

Utilizing the code receiving apparatus 10, described before, the length of a particular portion of an indicia is somewhat indicated by the length of time a contact is maintained between the contact arm assembly 82 and a particular portion of the code contact assembly 84, assuming the operator is moving the writing instrument 12 at a constant rate of speed at all times during the marking of the indicia on the writing surface. However, since an operator can seldom be relied upon to act at a constant rate of speed, the modified tip assembly 46b includes the wheels 218 and 220 and the cooperating detectors 230 and 232 to cause the signal generating network 14 to generate and transmit a distance signal simultaneously with the indicia indicating signals and the orientation signals, thereby providing a positive, reliable indication of the distance or length of each indicia portion.

Changes may be made in the construction and the operation of the various components and assemblies of the various embodiments disclosed herein without departing from the spirit and scope of the invention as defined in the following claims.

What is claimed is:

1. A code generating and receiving apparatus for marking indicia on a writing surface or the like and generating an indicia code indicative of the marked indicia, the apparatus comprising:

code generating means, comprising:
a housing;
a bearing connected to the housing having a bearing surface formed on a portion thereof;
a writing ball having a portion engaging the bearing surface and being rotatingly supported in a portion of the housing, a portion of the writing ball engaging the writing surface in a marking position of the code generating means and rotatingly moving and marking a preselected indicia on the writing surface in a code generating position of the code generating means;
code contact means supported within the housing having a plurality of contact end portions, predetermined indicia indicating signals being generated in a contactingly engaged position of predetermined contact end portions, each indicia indicating signal being indicative of a portion of the marked indicia and a predetermined number of indicia indicating signals being indicative of the indicia code representing the marked indicia;
contact arm means supported within the housing having a portion engaging a portion of the writing ball and the rotation of the writing ball moving a portion of the contact arm means into contacting engagement with predetermined contact end portions of the code contact means via the engagement between the contact arm means and the writing ball; and receiving means receiving the generated indicia indicating signals and deciphering the received indicia indicating signals to identify the indicia code and the indicia represented thereby.

2. The apparatus of claim 1 wherein the receiving means is defined further to include a portion generating a feedback signal indicative of the deciphered indicia code; and wherein the code generating apparatus includes: means receiving the feedback signal indicative of the deciphered indicia code and providing an operator-perceivable indication of the indicia represented thereby in response thereto.

3. The apparatus of claim 1 wherein the code generating means is defined further to include:
means supported in the housing generating an orientation signal responsive to the orientation of the housing simultaneous with the generation of the indicia indicating signals, a predetermined number of orientation signals and indicia indicating signals comprising the indicia code representing the marked indicia substantially independent of the orientation of the housing.

4. The apparatus of claim 1 defined further to include: support means secured in the housing securing the contact end portions of the code contact means circumferentially disposed about a portion of the contact arm means and spaced a distance radially therefrom, in one position thereof, the portion of the contact arm means spaced from the contact end portions being moved into contacting engagement with predetermined contact end portions in response to rotational movement of the writing ball and the contact end portions contactingly engaged being indicative of the direction of movement of the code generating means during the marking of the indicia on the writing surface.

5. The apparatus of claim 4 wherein the contact end portions are disposed in a predetermined number of sectors circumferentially about a portion of the contact arm means, the sequence of sectors determined via contacting engagement between the contact end portions and the portion of the contact arm means being the indicia code representing the marked indicia.

6. The apparatus of claim 1 wherein the housing includes a hollow opening therethrough intersecting a writing end thereof, and wherein the apparatus is defined further to include:
 a tip housing, having an upper end and a lower end and a hollow portion extending therethrough intersecting the upper end and the lower end, the writing ball means being disposed in the hollow portion generally near the lower end thereof and the lower end portion of the tip housing being reciprocatingly disposed within the hollow opening of the housing through the writing end thereof;
 an upwardly extending contact secured within the hollow portion of the tip housing;
 a downwardly extending contact secured within the hollow opening of the housing;
 spring means secured to the housing and to the tip housing spacing the upwardly extending contact a distance from the downwardly extending contact, the tip housing being reciprocated within the housing against the biasing force of the spring means and moving the upwardly extending contact and the downwardly extending contact into contacting engagement in a marking position and in a code generating position of the code generating means; and
 means connected to the upwardly extending contact and to the downwardly extending contact and generating a code initiate signal in response to contacting engagement therebetween.

7. The apparatus of claim 1 wherein the indicia indicating signals are generally within the ratio frequency range; and wherein the code generating means includes: an antenna means connected to the means generating the indicia indicating signals, the indicia indicating signals being generated and transmitted via the code generating means.

8. A code generating and receiving apparatus for marking indicia on a writing surface of the like and generating an indicia code indicative of the marked indicia, the apparatus comprising:
 code generating means, comprising:
  a housing;
  a writing ball rotatingly supported in a portion of the housing engaging the writing surface in a marking position of the code generating apparatus and rotatingly moving and marking a preselected indicia on the writing surface in a code generating position of the code generating apparatus;
  a bearing secured in the housing rotatingly supporting the writing ball;
  code contact means supported within the housing having a plurality of contact end portions, predetermined indicia indicating signals being generated in a contactingly engaged position of predetermined contact end portions;
  a lower contact ball rotatingly supported within a portion of the housing, a portion of the lower contact ball engaging a portion of the writing ball, the lower contact ball being rotated in response to the rotational movement of the writing ball via the engagement therebetween;
  a bearing secured in the housing rotatingly supporting the lower contact ball; and
  an upper contact ball connected to the lower contact ball and being pivotally moved into contacting engagement with predetermined contact end portions of the code contact means in response to the rotational movement of the lower contact ball, each indicia indicating signal being indicative of a portion of the marked indicia and a predetermined number of the indicia indicating signals being indicative of the indicia code representing the marked indicia; and
 receiving means receiving the generated indicia indicating signals and deciphering the received indicia indicating signals to identify the indicia code and the indicia represented thereby.

9. A code generating and receiving apparatus for marking indicia on a writing surface or the like and generating an indicia code indicative of the marked indicia, the apparatus comprising:
 code generating means, comprising:
  a housing;
  a writing ball rotatingly supported in a portion of the housing engaging the writing surface in a marking position of the code generating apparatus and rotatingly moving and marking a preselected indicia on the writing surface in a code generating position of the code generating apparatus; and
  a bearing secured in the housing rotatingly supporting the writing ball;
  code contact means supported within the housing having a plurality of contact end portions, predetermined indicia indicating signals being generated in a contactingly engaged position of predetermined contact end portions; and
  an upper contact ball connected to the writing ball and being pivotally moved into contacting engagement with predetermined contact end portions of the code contact means in response to the rotational movement of the writing ball means, each indicia indicating signal being indicative of a portion of the marked indicia and a predetermined number of the indicia indicating signals being indicative of the indicia code representing the marked indicia; and
 receiving means receiving the generated indicia indicating signals and deciphering the received indicia indicating signals to identify the indicia code and the indicia represented thereby.

10. A code generating and receiving apparatus for marking indicia on a writing surface or the like and generating an indicia code indicative of the marked indicia, the apparatus comprising:

code generating means, comprising:
  a housing;
  a writing ball rotatingly supported in a portion of the housing engaging the writing surface in a marking position of the code generating apparatus and rotatingly moving and marking a preselected indicia on the writing surface in a code generating position of the code generating apparatus;
  a bearing secured in the housing rotatingly supporting the writing ball;
  code contact means supported within the housing having a plurality of contact end portions, predetermined indicia indicating signals being generated in a contactingly engaged position of predetermined contact end portions;
  contact arm means supported within the housing having a portion engaging a portion of the writing ball and a portion moved into contacting engagement with predetermined contact end portions of the code contact means in response to rotational movement of the writing ball means;
  support means secured in the housing securing the contact end portions of the code contact means circumferentially disposed about a portion of the contact arm means and spaced a distance radially therefrom, in one position thereof, the contact end portions being disposed in a predetermined number of sectors circumferentially about a portion of the contact arm means, the portion of the contact arm means spaced from the contact end portions being moved into contacting engagement with predetermined contact end portions in response to rotational movement of the writing ball, the contact end portions contactingly engaged being indicative of the direction of movement of the code generating means during the marking of the indicia on the writing surface and the sequence of sectors determined via contacting engagement between the contact end portions and the portion of the contact arm means being the indicia code representing the marked indicia; and
  an orientation member movably supported within a portion of the housing contactingly engaging a portion of one of the portions of the contact end portions in response to and indicative of the orientation of the housing, the code generating means generating an orientation signal in response to the contacting engagement between the orientation member and the code contact means simultaneously with the generation of the indicia indicating signals, the orientation signals and the indicia indicating signals being indicative of the sequence of sectors and comprising the indicia code substantially independent of the orientation of the housing, each indicia indicating signal being indicative of a portion of the marked indicia and a predetermined number of the indicia indicating signals being indicative of the indicia code representing the marked indicia; and
  receiving means receiving the generated indicia indicating signals and deciphering the received indicia indicating signals to identify the indicia code and the indicia represented thereby.

11. The apparatus of claim 10 defined further to include:
  rod means having one end connected to the lower contact ball and the opposite end connected to the upper contact ball; and
  retainer means secured in the housing means and disposed between the lower contact ball and the upper contact ball, the rod means extending through the retainer means and the retainer means resiliently supporting rod means and upper contact ball connected thereto spaced a distance from the contact end portions.

12. The apparatus of claim 10 wherein the support means includes an annular race formed therein, the orientation member means being movably disposed within the annular race and the position of the orientation member means in the annular race being indicative of the orientation of the housing means; and wherein the code contact means includes: conductor means connected to the contact end portions and a portion of the conductor means supported within the annular race and disposed to be contactingly engaged by the orientation member means, the orientation signal being generated in response to the contacting engagement between the orientation member means and the conductor means.

13. A code generating and receiving apparatus for marking indicia on a writing surface or the like and generating an indicia code indicative of the marked indicia, the apparatus comprising:
  code generating means, comprising:
    a housing;
    a writing ball rotatingly supported in a portion of the housing engaging the writing surface in a marking position of the code generating apparatus and rotatingly moving and marking a preselected indicia on the writing surface in a code generating position of the code generating apparatus;
    code contact means supported within the housing means having a plurality of contact end portions, predetermined indicia indicating signals being generated in a contactingly engaged position of predetermined contact end portions, each indicia indicating signals being indicative of a portion of the marked indicia and a predetermined number of the indicia indicating signals being indicative of the indicia code representing the marked indicia;
    contact arm means supported within the housing having a portion engaging a portion of the writing ball and a portion moved into contacting engagement with predetermined contact end portions of the code contact means in response to rotational movement of the writing ball;
    means detecting the rotational movement of the writing ball means as the writing ball means marks an indicia portion on the writing surface and generating distance signals indicative of the amount of rotational movement of the writing ball means, the distance signals being thereby indicative of the length of the marked indicia; and receiving means receiving the generated indicia indicating signals and deciphering the received indicia indicating signals to identify the indicia code and the indicia represented thereby.

14. The apparatus of claim 13 wherein the means detecting rotational movement of the writing ball means includes:

wheel means rotatingly supported in the housing means having a portion engaging the writing ball means, the wheel means being rotated in response to the rotational movement of the writing ball means via the engagement therebetween; and means to detect the amount of rotational movement of the wheel means and generate the distance signals in response thereto.

15. A code generating and receiving apparatus for marking indicia on a writing surface or the like and generating an indicia code indicative of the marked indicia, the apparatus comprising:

code generating means, comprising:

a housing;

a writing ball rotatingly supported in a portion of the housing engaging the writing surface in a marking position of the code generating apparatus and rotatingly moving and marking a preselected indicia on the writing surface in a code generating position of the code generating apparatus;

code contact means supported within the housing means having a plurality of contact end portions, predetermined indicia indicating signals being generated in a contactingly engaged position of predetermined contact end portions, each indicia indicating signal being indicative of a portion of the marked indicia and a predetermined number of the indicia indicating signals being indicative of the indicia code representing the marked indicia;

contact arm means supported within the housing having a portion engaging a portion of the writing ball and a portion moved into contacting engagement with predetermined contact end portions of the code contact means in response to rotational movement of the writing ball;

means supported in the housing generating a code initiate signal in a marking position of the code generating means;

means supported in the housing generating a code cancel signal in one position; and means supported in the housing receiving a feedback signal and providing operator-perceivable indications indicative of each received feedback signal;

receiving means receiving the generated indicia indicating signals and deciphering the received indicia indicating signals to identify the indicia code and the indicia represented thereby, comprising:

means receiving the code initiate signal and positioning the receiving means to receive, identify and decipher subsequently received indicia indicating signals;

means receiving the code cancel signal and canceling the previously received indicia indicating signals of an indicia code in response thereto; and means generating feedback signals, comprising:

means generating a code cancel received signal in response to and indicative of a received code cancel signal;

means generating a signal indicative of a received code initiate signal; and means generating a signal indicative of the deciphered indicia code.

16. A code generating apparatus for marking indicia on a writing surface or the like and generating an indicia code indicative of the marked indicia, the apparatus comprising:

a housing;

a bearing connected to the housing having a bearing surface formed on a portion thereof;

a writing ball having a portion engaging the bearing surface and being rotatingly supported in a portion of the housing, a portion of the writing ball engaging the writing surface in a marking position and rotatingly moving and marking an indicia on the writing surface in a code generating position;

code contact means supported within the housing having a plurality of contact end portions, predetermined indicia indicating signals being generated in a contactingly engaged position of predetermined contact end portions, a predetermined number of indicia indicating signals being the indicia code; and contact arm means supported within the housing having a portion engaging a portion of the writing ball and the rotation of the writing ball moving a portion of the contact arm means into contacting engagement with predetermined contact end portions of the code contact means via the engagement between the contact arm means and the writing ball.

17. The apparatus of claim 16 defined further to include: support means secured in the housing securing the contact end portions of the code contact means circumferentially disposed about a portion of the contact arm means and spaced a distance radially therefrom, in one position thereof, the portion of the contact arm means spaced from the contact end portions being moved into contacting engagement with predetermined contact end portions in response to rotational movement of the writing ball and the contact end portions contactingly engaged being indicative of the direction of movement of the code generating means during the marking of the indicia on the writing surface.

18. The apparatus of claim 17 wherein the contact end portions are disposed in a predetermined number of sectors circumferentially about a portion of the contact arm means, the sequence of sectors determined via contacting engagement between the contact end portions and the portion of the contact arm means being the indicia code representing the marked indicia.

19. The code generating apparatus for marking indicia on a writing surface or the like and generating an indicia code indicative of the marked indicia, the apparatus comprising:

a housing;

a writing ball rotatingly supported in a portion of the housing engaging the writing surface in a marking position and rotatingly moving and marking an indicia on the writing surface in a code generating position;

code contact means supported within the housing having a plurality of contact end portions, predetermined indicia indicating signals being generated in a contactingly engaged position of predetermined contact end portions;

a lower contact ball rotatingly supported within a portion of the housing, a portion of the lower contact ball engaging a portion of the writing ball, the lower contact ball being rotated in response to the rotational movement of the writing ball via the engagement therebetween;

a bearing secured in the housing means rotatingly supporting the lower contact ball; and an upper contact ball connected to the lower contact ball and being pivotally moved into contacting engagement with predetermined contact end portions of the code contact means in response to the rotational movement of the lower contact ball.

20. The code generating apparatus for marking indicia on a writing surface or the like and generating an indicia code indicative of the marked indicia, the apparatus comprising:

a housing;

a writing ball rotatingly supported in a portion of the housing engaging the writing surface in a marking position and rotatingly moving and marking an indicia on the writing surface in a code generating position;

code contact means supported within the housing having a plurality of contact end portions, predetermined indicia indicating signals being generated in a contactingly engaged position of predetermined contact end portions; and an upper contact ball connected to the writing ball and being pivotally moved into contacting engagement with predetermined contact end portions of the code contact means in response to the rotational movement of the writing ball.

21. A code generating apparatus for marking indicia on a writing surface or the like and generating an indicia code indicative of the marked indicia, the apparatus comprising:

a housing;

a writing ball rotatingly supported in a portion of the housing engaging the writing surface in a marking position and rotatingly moving and marking an indicia on the writing surface in a code generating position;

code contact means supported within the housing having a plurality of contact end portions, predetermined indicia indicating signals being generated in a contactingly engaged position of predetermined contact end portions, a predetermined number of indicia indicating signals being the indicia code;

contact arm means supported within the housing having a portion engaging a portion of the writing ball and a portion moved into contacting engagement with predetermined contact end portions of the code contact means in response to rotational movement of the writing ball; and means detecting the rotational movement of the writing ball means as the writing ball means marks an indicia portion on the writing surface and generating distance signals indicative of the amount of rotational movement of the writing ball means, the distance signals being thereby indicative of the length of the marked indicia.

22. The apparatus of claim 21 wherein the means detecting rotational movement of the writing ball includes:

wheel means rotatingly supported in the housing means having a portion engaging the writing ball, the wheel means being rotated in response to the rotational movement of the writing ball via the engagement therebetween; and means to detect the amount of rotational movement of the wheel means and generate the distance signals in response thereto.

23. A code generating apparatus for marking indicia on a writing surface or the like and generating an indicia code indicative of the marked indicia, the apparatus comprising:

a housing;

means supported in the housing marking an indicia on the writing surface, in one position thereof;

means generating indicia indicating signals indicative of the marked indicia, a predetermined number of the indicia indicating signals being indicative of the indicia code; and means supported in the housing generating orientation signals responsive to the orientation of the code generating apparatus, a predetermined number of orientation signals and the indicia indicating signals simultaneously generated comprising the indicia code, the orientation signals establishing a reference point for identifying the sequence of indicia indicating signals substantially independent of the orientation of the code generating apparatus, including:

an orientation member movably supported within a portion of the housing, the position of the orientation member being indicative of the orientation of the housing, the orientation signals being generated in response to the position of the orientation member.

24. The apparatus of claim 23 defined further to include:

support means secured within a portion of the housing means having an annular race formed therein, the orientation member being movably disposed within the annular race; and conductor means supported within predetermined portions of the annular race and disposed to be contactingly engaged by the orientation member means, the orientation signals being generated in response to the contacting engagement between the orientation member means and the conductor means.

* * * * *